United States Patent
Palmin

(10) Patent No.: US 10,574,671 B2
(45) Date of Patent: Feb. 25, 2020

(54) METHOD FOR MONITORING SECURITY IN AN AUTOMATION NETWORK, AND AUTOMATION NETWORK

(71) Applicant: Siemens Aktiengesellschaft, Munich (DE)

(72) Inventor: Anna Palmin, Karlsruhe (DE)

(73) Assignee: Siemens Aktiengesellschaft, Munich (DE)

(*) Notice: Subject to any disclaimer, the term of this patent is extended or adjusted under 35 U.S.C. 154(b) by 262 days.

(21) Appl. No.: 14/622,005

(22) Filed: Feb. 13, 2015

(65) Prior Publication Data

US 2015/0229660 A1    Aug. 13, 2015

(30) Foreign Application Priority Data

Feb. 13, 2014    (EP) .................................... 14155064

(51) Int. Cl.
*G06F 11/00*    (2006.01)
*G06F 12/14*    (2006.01)
(Continued)

(52) U.S. Cl.
CPC ............ *H04L 63/1416* (2013.01); *G05B 9/03* (2013.01); *G05B 19/0428* (2013.01);
(Continued)

(58) Field of Classification Search
CPC ....... G05B 9/03; H04L 63/1416; H04L 45/70; H04L 67/10
See application file for complete search history.

(56) References Cited

U.S. PATENT DOCUMENTS 5,541,589 A * 7/1996 Delaney ............... G01R 21/133
340/13.33
6,058,420 A * 5/2000 Davies ................ H04L 43/0805
709/224
(Continued)

FOREIGN PATENT DOCUMENTS

CN    102224466    10/2011
CN    102239472    11/2011
(Continued)

OTHER PUBLICATIONS

Palmin et al. "Ganzheitliches anlagenweites Security Management—Werkzeuge für die automatisierte Unterstützung"; ATP Edition, DIV Deutscher Industrieverlag GmbH; vol. 54; No. 3; pp. 34-40; ISSN:2190-4111; XP008170537; Jan. 1, 2012.
(Continued)

*Primary Examiner* — John B King
*Assistant Examiner* — Darshan I Dhruv
(74) *Attorney, Agent, or Firm* — Cozen O'Connor

(57) ABSTRACT

An automation network includes a plurality of data processing devices that are connected to one another for data communication. At least one data processing device in a first state, from the plurality of data processing devices, is preconfigured such that it generates corresponding messages upon identifying one or more security-relevant events. The messages are transmitted to at least one first software tool configured to record and evaluate the messages to determine whether there is a security-relevant attack on the automation network. The messages are transmitted to a second software tool configured to record and evaluate the messages and to determine whether the corresponding messages are generated by the at least one data processing device.

9 Claims, 5 Drawing Sheets

(51) Int. Cl.
  *G06F 12/16* (2006.01)
  *G08B 23/00* (2006.01)
  *H04L 29/06* (2006.01)
  *H04L 29/08* (2006.01)
  *H04L 12/721* (2013.01)
  *G05B 19/042* (2006.01)
  *G05B 9/03* (2006.01)

(52) U.S. Cl.
  CPC ............. *H04L 45/70* (2013.01); *H04L 67/10* (2013.01); *G05B 2219/24065* (2013.01); *G05B 2219/24182* (2013.01)

(56) References Cited

U.S. PATENT DOCUMENTS

| | | | | |
|---|---|---|---|---|
| 7,954,159 | B2* | 5/2011 | Hrabik | H04L 63/1416 713/188 |
| 8,914,406 | B1* | 12/2014 | Haugsnes | H04L 63/1441 707/769 |
| 9,282,114 | B1* | 3/2016 | Dotan | G06F 21/552 |
| 2004/0107345 | A1* | 6/2004 | Brandt | G05B 15/02 713/171 |
| 2004/0190442 | A1* | 9/2004 | Lee | H04L 29/06 370/217 |
| 2005/0005093 | A1* | 1/2005 | Bartels | G06F 21/606 713/150 |
| 2005/0015624 | A1* | 1/2005 | Ginter | G06F 21/55 726/4 |
| 2007/0061628 | A1* | 3/2007 | Bradbury | G06F 11/3632 714/39 |
| 2007/0294369 | A1* | 12/2007 | Ginter | G06F 21/55 709/217 |
| 2009/0007270 | A1* | 1/2009 | Futoransky | H04L 63/1433 726/25 |
| 2009/0122697 | A1* | 5/2009 | Madhyasha | H04L 41/12 370/229 |
| 2009/0126014 | A1* | 5/2009 | Brady | H04L 63/1425 726/22 |
| 2010/0011031 | A1* | 1/2010 | Huang | G06F 21/552 707/E17.007 |
| 2011/0072506 | A1 | 3/2011 | Law et al. | |
| 2011/0258022 | A1* | 10/2011 | Forbes, Jr. | G01D 4/004 705/7.39 |
| 2011/0288692 | A1* | 11/2011 | Scott | G06F 21/55 700/297 |
| 2012/0022671 | A1 | 1/2012 | Sachs et al. | |
| 2012/0198277 | A1 | 8/2012 | Busser et al. | |
| 2012/0281524 | A1* | 11/2012 | Farkas | H04L 45/00 370/221 |
| 2012/0297482 | A1 | 11/2012 | Boot et al. | |
| 2012/0311562 | A1 | 12/2012 | Wang et al. | |
| 2013/0031037 | A1* | 1/2013 | Brandt | H04L 63/1408 706/12 |
| 2013/0291106 | A1* | 10/2013 | Simonoff | G06F 21/552 726/23 |
| 2013/0312101 | A1* | 11/2013 | Lotem | G06F 21/55 726/25 |
| 2014/0012796 | A1* | 1/2014 | Petersen | H04L 41/069 706/47 |
| 2014/0058689 | A1* | 2/2014 | Klien | H04L 63/14 702/60 |
| 2014/0298399 | A1* | 10/2014 | Heo | H04L 63/1416 726/1 |
| 2016/0034361 | A1* | 2/2016 | Block | H04L 63/1416 714/4.12 |

FOREIGN PATENT DOCUMENTS

| | | |
|---|---|---|
| CN | 102577305 | 7/2012 |
| CN | 102790778 | 11/2012 |
| EP | 2 506 521 | 10/2012 |

OTHER PUBLICATIONS

Office Action dated Mar. 16, 2017 which issued in the corresponding Chinese Patent Application No. 2015100759897.

* cited by examiner

METHOD FOR MONITORING SECURITY IN AN AUTOMATION NETWORK, AND AUTOMATION NETWORK

BACKGROUND OF THE INVENTION

1. Field of the Invention

The application generally relates to a method for monitoring security in an automation network, in which a plurality of data processing devices are connected to one another for the purpose of data communication.

From the point of view of data processing, industrial automation networks include a data network and data processing devices that are connected to one another by the data network to communicate data. In order to make it possible to operate an industrial installation automated by the automation network from a remote station, for example, automation networks can be connected to a public network (e.g., the Internet), using a gateway. Various advantages when implementing modern automation networks result in the increased use of IT technologies such as Ethernet and the Internet Protocol (IP). However, this increases the security risks, as a result of unauthorized interventions in the respective automation network from the outside.

2. Related Art

The article "Ganzheitliches anlagenweites Security Management—Werkzeuge für die automatisierte Unterstützung" [Integral installation-wide security management—tools for automated assistance] by Anna Palmin, Stefan Runde and Pierre Kobes, published in atp, March 2012, pages 34 to 40, describes measures for improving security in industrial automation networks. One of the important measures within the scope of integral security management is the recording and evaluation of messages that are generated by various components of the automation network in the case of events and can possibly reveal an attack. A superordinate unit collects and evaluates the messages to discern from the reported individual events or a combination of a plurality of events whether an attack is actually taking place and possibly report this attack to a station so that suitable measures can be initiated in response to the discerned attack. This functionality is referred to as Security Event Management (SEM).

Another functionality relates to the generation of reports in order to demonstrate the compliance with guidelines. This is referred to as Security Information Management (SIM). If a unit combines the two functionalities mentioned, it is referred to as Security Information and Event Management (SIEM). A computing unit having a software tool that is used to implement SIEM in an automation network is presented as a security station in the above-mentioned article. The security station is structurally classified as a process control system (PCS). An operator station and the security station can run together on a personal computer (PC) or on two separate PCs. The security station may likewise be implemented in an already existing maintenance station. The security station is used to integrate the security management in the process control system and to allow it to run in parallel with the installation automation.

The existing views, for example the operational view and the maintenance view, are therefore supplemented with an additional integrated security view of the installation. In addition, the reporting and archiving system present in the automation network can be used to process the messages generated for security-relevant events. As an alternative to an integrated software tool, the security station can be implemented as a tool that is independent of specific products and has clearly defined interfaces. It can therefore be flexibly used in the context of PCS and SCADA (Supervisory Control and Data Acquisition) systems. The software tool of the security station is used to monitor security in the automation network, specifically by recording and evaluating messages that are generated by an operating unit (often referred to as an operator station), a programmable logic controller, a so-called controller, network components, such as routers, switches or gateways, or field devices, such as actuators or measuring transducers for pressure, temperature or flow rate.

The above mentioned devices are generally referred to herein as data processing devices or as event sources for short. Due to their corresponding preconfiguration, the data processing devices generate messages corresponding to security-relevant events in the case of the latter. Examples of security-relevant events include a detected failed attempt to log onto a PC, which is recorded in the Windows event log, or a detected unauthorized access to an IP address, which is warded off by a firewall and possibly recorded in a log file. The reported events are normalized in so-called connectors of the SIEM system. The normalization is generally implemented as mapping of individual parts or parameters to the data structure of the SIEM. In this case, prefabricated connectors for integrating Syslog-enabled and/or SNMP-enabled components such as switches, firewalls and routers and prefabricated connectors for integrating Windows components are present.

An SIEM system is generally configured in the engineering phase, that is to say when planning and starting up an automation installation. Configuration comprises, inter alia, connecting data processing devices, which are possible as sources for messages relating to security-relevant events, to an SIEM system using the corresponding connectors. In this case, the goal is for the SIEM system to avoid communicating with any sources of event messages that are unknown to it since this could impair the security monitoring reliability. It should likewise be ensured that, in the case of security-relevant events, corresponding messages are actually generated by the data processing device concerned.

The primary goal of an SIEM system used in an automation installation is to promptly detect and evaluate indications of attempted attacks or deviations from the normal state. The SIEM system is configured to make it possible to react to attempted attacks and abnormalities promptly and appropriately.

SUMMARY OF THE INVENTION

An object of the present disclosure is improving the quality and/or reliability of the detection of indications of attempted attacks or deviations from the normal state in an automation network.

For the quality of the detection of attempted attacks or deviations from the normal state, in addition to the quality of the evaluation unit that is used, for example, in an SIEM system and is referred to as a correlation engine, and the quality of the rules created using this evaluation unit, it is important that the security-relevant events that are required for detection are transmitted from the components of the automation installation, which are referred to herein as data processing devices, to the evaluation unit reliably, in accordance with the rules preconfigured, for example, in the data processing device, without a loss of messages during transmission, and in a tamperproof manner. It is now advantageously ensured that the data processing devices that are connected to, for example, an SIEM system, and have been appropriately preconfigured in the engineering phase, as sources of the messages relating to security-relevant events, also report the security-relevant events belonging to their standard scope during operation of the automation network. If the generation of corresponding messages is prevented in a data processing device, for example as a result of an inadvertent change in the settings made during preconfiguration, this is now detected. It is also advantageously ensured that, in an SIEM system, the so-called connectors that are also referred to as agents or forwarders and, in the first software tool, are responsible for transmitting messages relating to security-relevant events from the data processing devices, as message sources, to the evaluation unit, operate according to the specifications. A deviation from the behavior of the connectors according to the specifications (e.g., if a connector no longer forwards events to the evaluation unit of the first software tool due to a technical problem) is detected by the second software tool.

In one embodiment, checks by the second software tool can be initiated in a non-deterministic manner, for example in a manner controlled by a pseudorandom generator, or in an event-controlled manner by recording and evaluating messages. The generation of messages is preferably checked deterministically or cyclically in predefined or predefinable maximum intervals of time. This has the advantage of particularly good security monitoring reliability in an automation network.

The reliability can be increased further if, in order to check the generation of messages with the aid of the second software tool, attack scenarios are simulated wherein messages corresponding to the respective scenario are generated by the at least one data processing device in the error-free (e.g., first) state. The messages generated on account of an attack scenario being simulated are excluded from further evaluation in the first software tool to avoid triggering a false alarm, or the alarms generated on account of these messages are excluded from forwarding.

In one embodiment, in order to check the evaluation for messages that are carried out by the first software tool with the aid of the second software tool, manipulated messages (that correspond to the messages generated by data processing devices in the case of security-relevant events) are generated. This makes it possible to check whether Trojans or other "malware", (e.g., harmful data in the automation network), are detected. The security monitoring is further improved as a result.

In another advantageous embodiment, the first software tool is part of a first SIEM system in the automation network, and the second software tool is part of a second SIEM system, which is configured in a redundant manner with respect to the first SIEM system in the network. This makes it possible to implement a method for distributing the load between the two SIEM systems and prevents overloading of the so-called intelligence layer, which is referred to herein as the evaluation device, and of the so-called connector layer, which has the connectors. The generation of messages can advantageously be checked by the second software tool in a parallel manner without influencing the operation of the first software tool in the error-free case.

The generation of messages carried out by the first software tool can be advantageously checked, on the one hand, in order to verify the preconfiguration of data processing devices in the engineering phase or, on the other hand, in order to monitor security during operation of the automation network. In one aspect, the invention therefore allows security to be monitored in different phases of the installation life cycle.

When a security problem is detected in the automation network, a corresponding warning signal for indicating possibly required maintenance measures is preferably immediately output on a service device so that a service engineer receives suitable instructions for carrying out the maintenance work, by, for example, replacing a data processing device infected with malware, in situ.

In one embodiment method is preferably implemented in software or in a combination of software/hardware, with the result that the invention also relates to a computer program having program code instructions that can be executed by a computer for the purpose of implementing the method outlined above and described below. In this context, in one embodiment, the invention also relates to a computer program product, in particular a data storage medium or a storage medium, having such a computer program, which can be executed by a computer. Such a computer program is preferably part of a data processing device in the automation network or is held in a memory of the electronics of a data processing device or can be loaded into said memory. As a result, security is automatically monitored according to the method during operation of the data processing device.

Other objects and features will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and refinements and advantages are explained in more detail below using the drawings that illustrate exemplary embodiments of the invention and in which.

DETAILED DESCRIPTION OF THE PRESENTLY PREFERRED EMBODIMENTS

Figure 1:
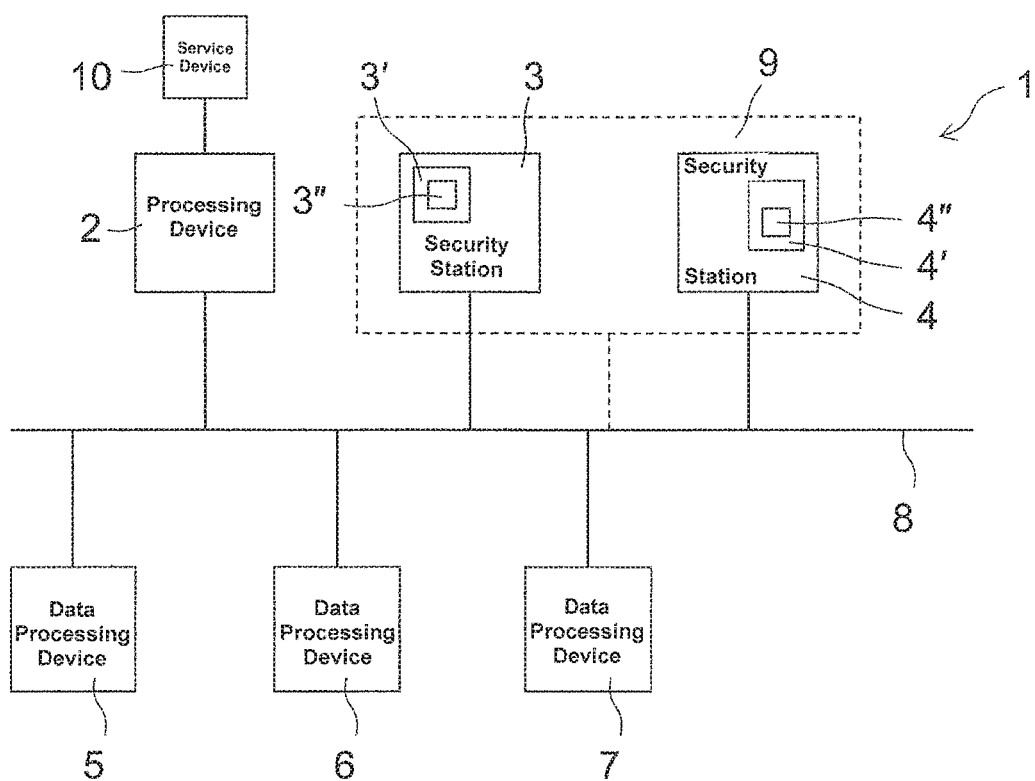
FIG. 1 shows a block diagram of an automation network.

FIG. 1 illustrates an automation network 1 in which a plurality of data processing devices 2 . . . 7 are connected to one another by an Ethernet-based communication network 8 for data communication. In the exemplary embodiment shown, the data processing device 2 is a so-called engineering station, which is used to plan and start up the automation network 1 and assumes the function of an operator station of the process control system during operation of the automation network 1. The data processing devices 3 and 4 are each security stations, wherein a first software tool 3' that forms part of a so-called industrial STEM runs in the data processing device 3 and a second software tool 4' that forms part of a second industrial SIEM, which is configured in a redundant manner with respect to the first industrial SIEM, runs in the second security station, that is to say in the data processing device 4.

Alternatively, in one embodiment the two software tools 3' and 4' may run in a single security station 9, as is indicated in FIG. 1 using broken lines. The data processing devices 5, 6 and 7 are components which are close to the process, for example a programmable logic controller, which is often referred to as a controller, a measuring transducer for recording a physical variable in the process to be automated, for example a pressure, or an actuator for influencing the process on the basis of the recorded physical variable, for example a control valve.

For redundant operation of the two SIEMs, which are implemented in the security stations 3 and 4 and form a redundant SIEM system, both SIEMs are supplied with the same planning data and the same information relating to the hardware structure of the automation network 1 by the engineering station 2. The second software tool 4', which is used to implement the second SIEM has been expanded with a module 4" for checking the operation of the first SIEM, wherein the module is referred to as a reliability and trustability verifier module according to its function. The redundant design of the SIEM system makes it possible to implement a suitable load distribution method, a so-called load balancing method, which is used to prevent the overloading of the so-called SIEM intelligence layer, which comprises, inter alia, an evaluation unit, and of the so-called connector layer, which comprises all SIEM connectors for connecting event sources.

Furthermore, the module 4" makes it possible to carry out the monitoring and verification processes described in more detail later using FIGS. 2 to 4. Whereas the first SIEM, for example, is dedicated to the primary SIEM tasks, the second SIEM, as its redundant partner, carries out the processes for checking the operation of the first SIEM and verification processes under the control of its reliability and trustability verifier module 4". In order to enable this, messages relating to security-relevant events in the automation network 1, which are known to be transmitted to the first software tool 3', are additionally also transmitted to the second software tool 4', which evaluates recorded messages, for example, in order to check whether the messages have actually been generated according to a correct preconfiguration of the data processing devices 2 . . . 7. In one embodiment, if the warning signal for indicating possibly required maintenance measures is output on a service device 10 upon detecting a security problem in the automation network, a service engineer can advantageously receive the information needed to plan his maintenance measures in situ.

In the exemplary embodiment shown, the first software tool 3' is likewise equipped with a reliability and trustability verifier module 3", which corresponds to the module 4". This enables a changeover, in which the first SIEM, which was previously active becomes the redundant SIEM and the second, previously redundant SIEM, which now becomes the currently active SIEM monitors for correct operation. Cyclically alternating, mutual monitoring is therefore carried out.

Figure 2:
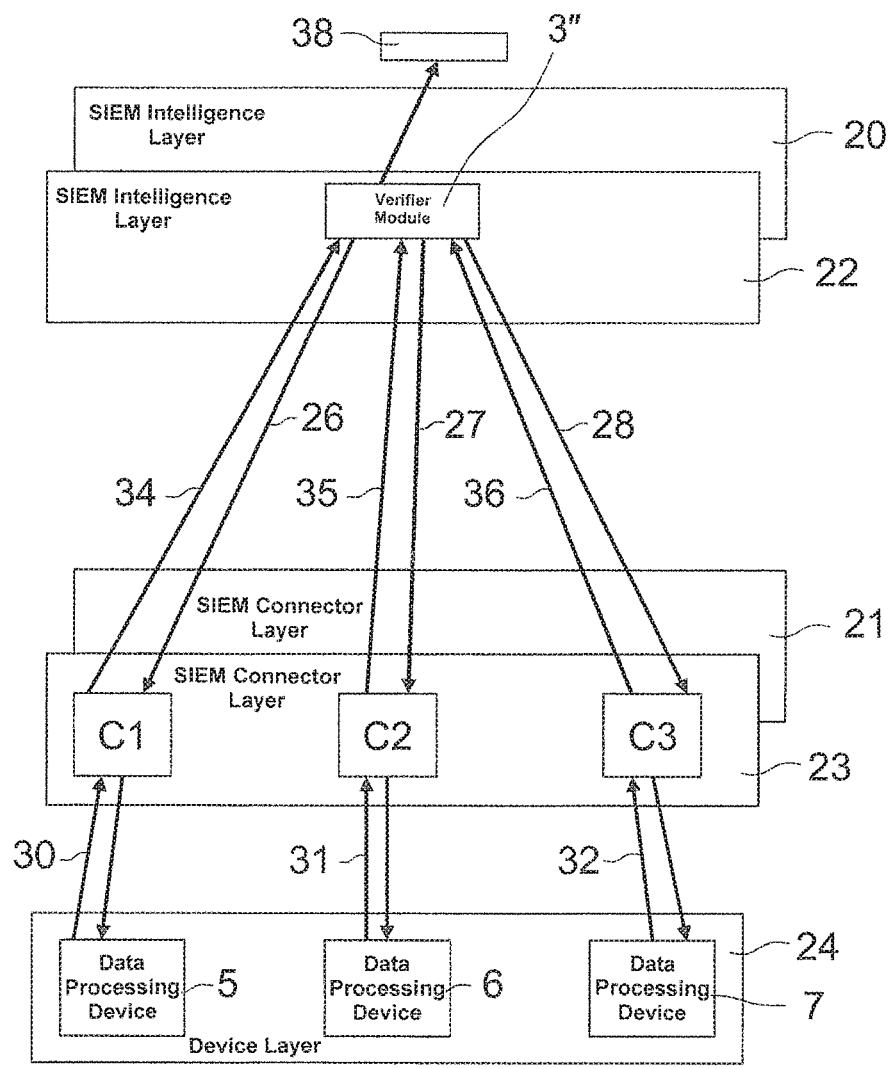
FIG. 2 shows a block diagram for illustrating a check of message generation.
Figure 3:
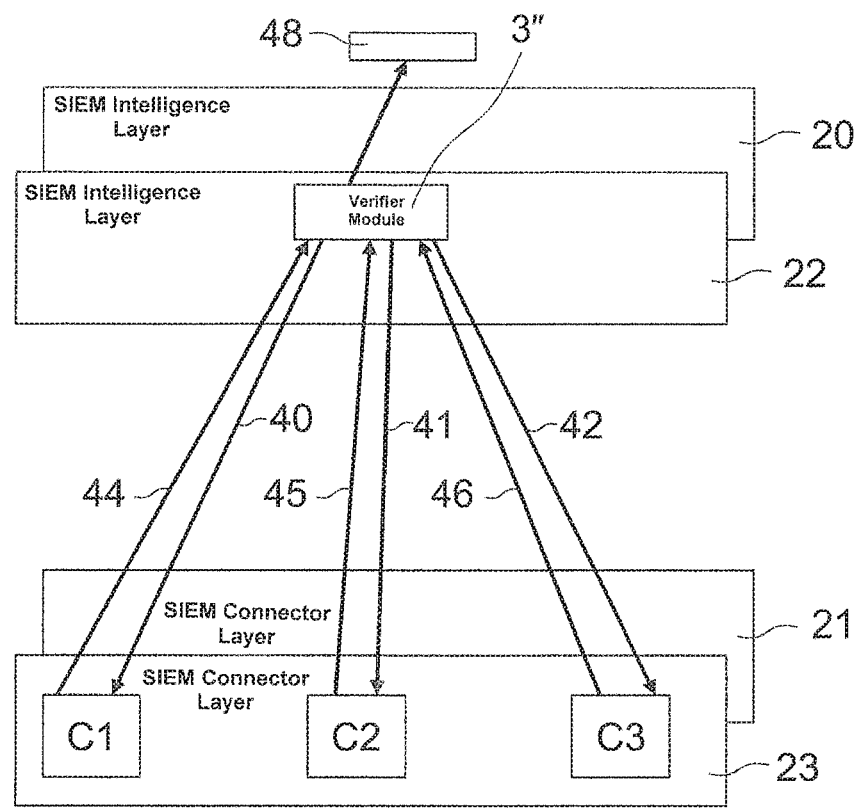
FIG. 3 shows a block diagram for illustrating a check of connectors.
Figure 4:
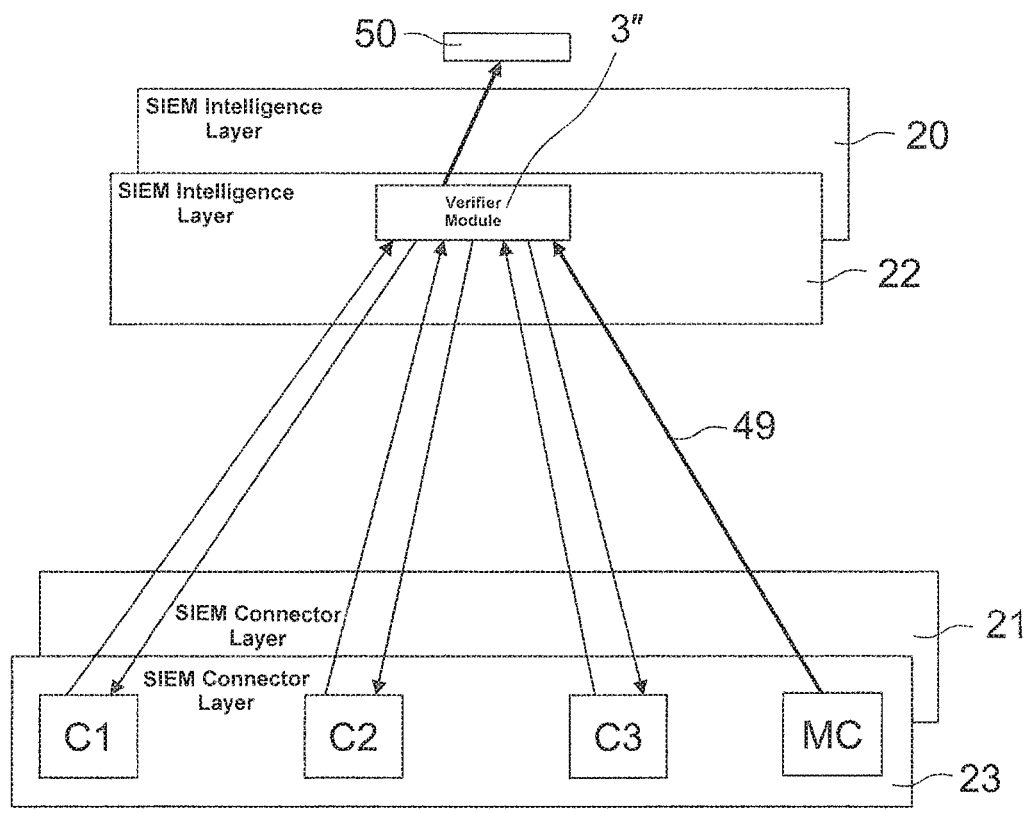
FIG. 4 shows a block diagram for illustrating a check of reliable detectability of manipulated messages.

In order to further explain the method for checking security in an automation network, FIGS. 2 to 4 illustrate the redundantly configured architecture of the SIEM system in a layer model. Identical reference symbols are used for identical parts in FIGS. 1 to 4. An SIEM intelligence layer 20 and an SIEM connector layer 21 are substantially implemented in the first software tool 3' (FIG. 1). An SIEM intelligence layer 22 and an SIEM connector layer 23 are parts of the second SIEM, which is implemented by the second software tool 4' (FIG. 1). A so-called device layer 24 in which the messages are generated according to preconfigured rules in the case of security-relevant events is substantially implemented by software in the data processing devices 5 . . . 7.

So-called "events generation verification", that is to say a check of the generation of messages, according to FIG. 2 can be initiated both in the engineering phase and in the runtime phase, that is to say during operation of an automation network, cyclically in a deterministic manner, in a non-deterministic manner, for example under the control of a pseudorandom generator, or in an event-controlled manner by the reliability and trustability verifier module 3". In this embodiment, selected connectors or all connectors C1, C2 and C3, which comprise, for example, connectors to the data processing devices 5, 6 and 7 in the automation network 1 according to FIG. 1, are each requested, by a signal 26, 27 and 28 or a command, to check whether the connected event sources, that is to say the data processing devices 5, 6 and 7, actually generate the messages 30, 31 and 32, which correspond to the security-relevant events belonging to their respective standard scope. For this purpose, the connectors C1, C2 and C3 interrogate the corresponding event interfaces or simulate attack scenarios so that the connected event sources generate messages corresponding to their respective preconfiguration. For example, the standard scope of Microsoft Windows includes various events that can be recorded in the so-called Windows event log. However, special system settings are needed to actually record the events. If the corresponding system settings have not been made, the corresponding connector may not receive any Windows event log events when checking the generation of messages. The connectors C1, C2 and C3 use a signal 34, 35 and 36 to report the respective result of the check to the reliability and trustability verifier module 3", which processes the result further according to the specifications and possibly forwards it to further entities, for example to an SIEM reporting system 38 in the form of alarms. Appropriate reactions, for example a configuration change to an event source, can be immediately prompted by these entities.

In one embodiment, a second checking mode, which is referred to as "connectors reliability verification" is explained below by FIG. 3. Like the events generation verification already explained by FIG. 2, this check can be initiated both in the engineering phase and in the runtime phase in a cyclical manner, in a non-deterministic manner or in an event-controlled manner by the reliability and trustability verifier module 3". When checking the connectors, that is to say during the connectors reliability verification, the module 3" requests a predefined number of event messages from selected connectors or all connectors C1, C2 and C3 by a respective signal or a command 40, 41 and 42. If the connectors C1, C2 and C3 are operating according to the specifications, they return the requested number of messages 44, 45 and 46 to the module 3", which first acknowledges receipt and then compares the number of messages with the requested number. If there is no match, there is a problem in the respective connector C1, C2 and C3 and/or a communication problem. A result of the verification process is processed further by the module 3" according to the specifications and may be forwarded to further entities, for example, to an STEM reporting system 38 in the form of alarms. Appropriate reactions, such as a configuration change to a connector identified as problematic, can be prompted by these entities.

In one embodiment, another mode for checking security in the automation network is the so-called "SIEM trustability verification" in which the reliability of the SIEM system is checked in a manner explained below using FIG. 4. Like the modes already described, this check of the reliability of the SIEM system can be initiated in various ways at different times. In this embodiment, the module 3" requests a so-called malicious connector MC to manipulate communication, for example, to insert events into communication between the connector layer 21, 23 and the intelligence layer 20, 22 under a false identity.

Accordingly, manipulated messages that correspond to the messages generated by a data processing device 2 . . . 7 in the case of security-relevant events are generated. If the reliability and trustability verifier module 3" manages to detect the manipulation attempt using means from the standard scope of the SIEM system, the result of the verification process is positive. Otherwise, if the module 3" cannot distinguish the inserted events from the real events, which have been sent by a legitimate connector C1, C2 or C3, the result is negative.

The result is processed further by the module 3" according to the specifications and is possibly forwarded to further entities, for example, to an STEM reporting system 38 in the form of alarms. Appropriate reactions, such as reconfiguration of the existing mechanisms for mutual authentication between the SIEM connector layer 21, 23 and the SIEM intelligence layer 20, 22, can be immediately prompted by these entities.

The advantages that result from carrying out the various verification processes and/or are provided by a redundant architecture of an SIEM system, are explained briefly below:

In one aspect, the redundant architecture of an SIEM system and the implementation of a suitable load balancing method prevent the loss of events caused by the overloading of the SIEM intelligence layer and of the connector layer and the transport paths. Furthermore, it is possible to carry out the described verification processes in an SIEM system. Whereas one SIEM is dedicated to the primary SIEM tasks, its redundant partner carries out verification processes under the control of the reliability and trustability verifier module.

It is ensured that a check can be carried out in order to determine whether the event sources that are connected to an SIEM system and have possibly been appropriately configured in the engineering phase actually generate the security-relevant events belonging to their standard scope in the runtime phase. If an event source connected to an SIEM system does not generate any events belonging to its standard scope in the runtime phase, this is detected by the reliability and trustability verifier module during "events generation verification" and is passed on. This makes it possible to immediately eliminate the detected problem.

It is also ensured that a check can be carried out in order to determine whether the connectors that are responsible for transmitting security-relevant events from the event sources to the evaluation unit are operating according to the specifications. A deviation from the behavior of the connectors according to the specifications is detected by the reliability and trustability verifier module during the "connectors reliability verification" and is passed on. This likewise makes it possible to immediately eliminate the detected problem.

In addition, it is also possible to check whether events can be lost, unnoticed, or manipulated on the transmission path to the evaluation unit. The loss of events on the transmission path can be detected by the reliability and trustability verifier module during the "connectors reliability verification" and/or during the "SIEM trustability verification" and can be passed on. Successful manipulation of the events on the transmission path from the so-called malicious connector to the evaluation unit is also detected by the reliability and trustability verifier module during the "SIEM trustability verification" and is passed on. This problem can therefore also be immediately eliminated by an appropriate reaction.

Figure 5:
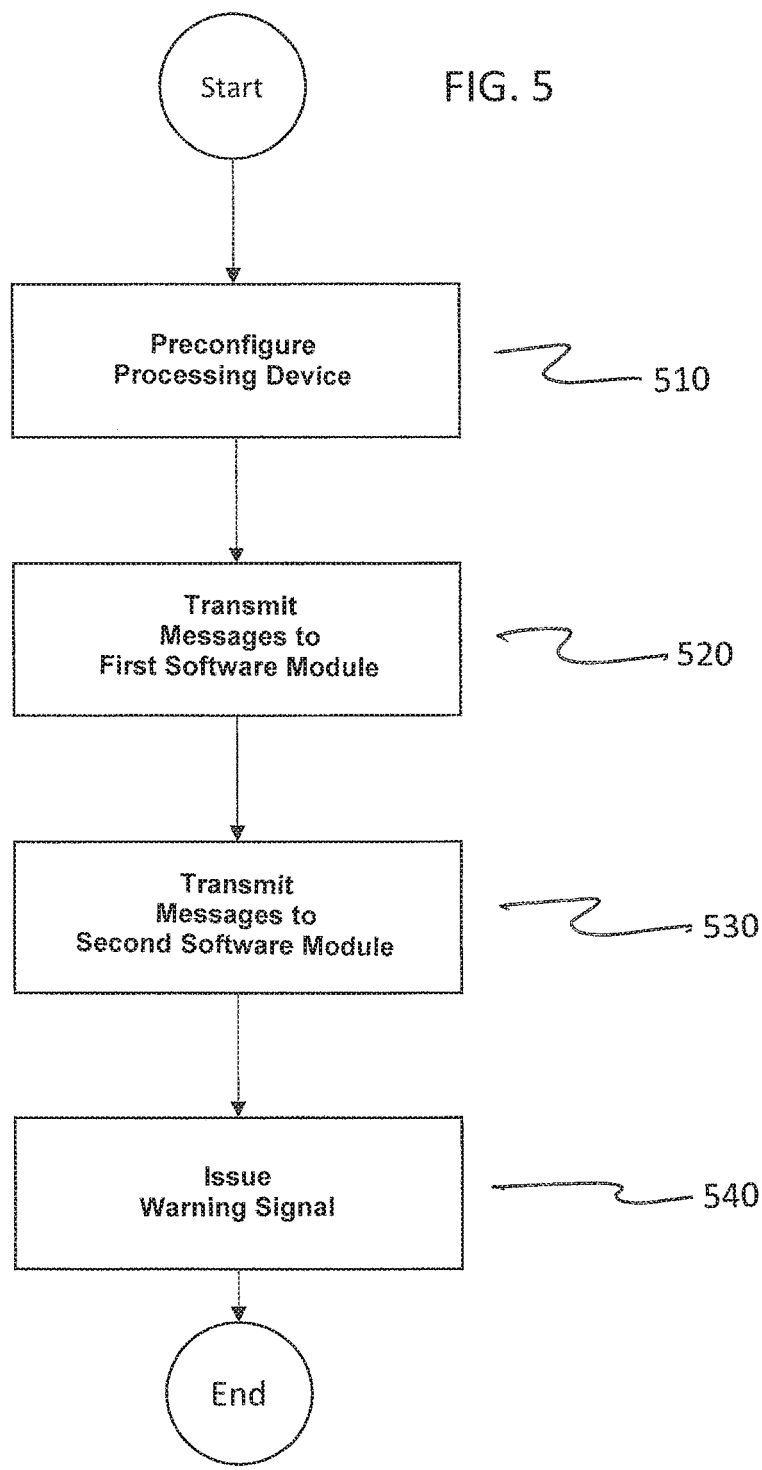
FIG. 5 shows a flowchart of the method in accordance with an embodiment of the invention.

Reference now is made to FIG. 5, which illustrates a method of monitoring security in an automation network having a plurality of data processing devices that are connected to one another for data communication, in accordance with an exemplary embodiment.

In step 510, at least one data processing device in a first state (from the plurality of data processing devices), is preconfigured such that it generates corresponding messages upon identifying one or more security-relevant events.

In step 520, the messages in the automation network are transmitted to at least one first software tool configured to record and evaluate the messages to determine whether there is a security-relevant attack on the automation network.

In step 530, the messages in the automation network are transmitted to a second software tool configured to record and evaluate the messages and to determine whether the corresponding messages are generated by the at least one data processing device.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A method of monitoring security in an industrial automation network having a plurality of data processing devices which are connected to one another for data communication, the method comprising:

preconfiguring at least one data processing device in a first state, from the plurality of data processing devices, said preconfigured at least one data processing device generating messages upon identifying one or more security-relevant events;

receiving generated corresponding messages in the automation network at at least one first software tool within a first security station, said at least one first software tool including a first reliability and trustability verifier module and being configured to record and evaluate the corresponding messages to determine whether there is a security-relevant attack on the industrial automation network;

transmitting the corresponding messages in the industrial automation network to at least one second software tool within a second security station, said at least one second software tool including a second reliability and trustability verifier module and being configured to record and evaluate the corresponding messages and to determine whether the corresponding messages were generated by the preconfigured at least one data processing device; and simulating attack scenarios by the second software tool by generating messages corresponding to a respective scenario by the preconfigured at least one data processing device in the first state, said messages corresponding to the respective scenario generated by said simulation being excluded from said evaluation in the first reliability and trustability verifier module; and issuing a warning signal on a service device to indicate required maintenance measures when the corresponding messages were not generated by the preconfigured at least one data processing device;

wherein connectors to the preconfigured at least one data processing device are each requested by an issued signal or a command to check whether the preconfigured at least one data processing device generated messages which correspond to the one or more security-relevant events belonging to respective standard scopes of each of the plurality of data processing devices, the connectors sending a reply signal to the second reliability and trustability verifier module in response to the issued signal or command to report a respective result of the check.

2. The method as claimed in claim 1, further comprising checking the generated corresponding messages cyclically at predetermined time intervals.

3. The method as claimed in claim 1, further comprising confirming the evaluation by the at least one first software tool and the at least one second software tool by generating manipulated messages that correspond to the messages generated by the at least one data processing device upon identifying a security-relevant event.

4. The method as claimed in claim 1, wherein the at least one first software tool is part of a first tool for a Security Information and Event Management (SIEM) in the industrial automation network, and the at least one second software tool is part of a second tool for the SIEM that is configured in a redundant manner with respect to the first tool for the SIEM in the industrial automation network.

5. The method as claimed in claim 1, further comprising evaluating the generation of messages performed by the at least one first software tool; and verifying the preconfiguration of the preconfigured at least one data processing device at least one of an engineering phase and during operation of the industrial automation network.

6. The method as claimed in claim 1, further comprising indicating, on an output of a service device, a warning signal that indicates a maintenance measure is possibly required.

7. An industrial automation network configured to provide security monitoring, the network comprising:
a plurality of data processing devices connected to one another in the industrial automation network and configured to provide data communication; and
at least one data processing device preconfigured in a first state to generate messages upon determining one or more security-relevant events, wherein the industrial automation network is configured to:
receive generated corresponding messages at least one software tool within a first security station, said at least one first software tool including a first reliability and trustability verifier module and being configured to record and evaluate the corresponding messages and to determine whether there is a security-relevant attack on the industrial automation network,
the corresponding messages being additionally transmitted to at least one second software tool within a second security station, said at least one second software tool including a second reliability and trustability verifier module and being configured to record, evaluate the corresponding messages, and to check whether the corresponding messages were generated by the preconfigured at least one data processing device, upon identifying a security-relevant event;
simulate attack scenarios by the second software tool by generating messages corresponding to a respective scenario by the preconfigured at least one data processing device in the first state, said messages corresponding to the respective scenario generated by said simulation being excluded from said evaluation in the first reliability and trustability verifier module; and
issue a warning signal on a service device to indicate required maintenance measures when the corresponding messages were not generated by the preprocessed at least one data processing device;
wherein connectors to the plurality of data processing devices are each requested by an issued signal or a command to check whether at least one data processing device of the plurality of data processing devices generated corresponding messages which correspond to the one or more security-relevant events belonging to respective standard scopes of each of the plurality of data processing devices, the connectors sending a reply signal to the second reliability and trustability verifier module in response to the issued signal or command to report a respective result of the check.

8. A non-transitory computer-readable medium encoded with a program having program code instructions which, when executed on a computer having a processor and memory, causes security monitoring in an industrial automation network having a plurality of data processing devices which are connected to one another for data communication, the program comprising:
program code instructions for preconfiguring at least one data processing device in a first state, from the plurality of data processing devices, said preconfigured at least one data processing device generating messages upon identifying one or more security-relevant events;
program code instructions for receiving generated corresponding messages in the automation network at at least one first software tool within a first security station, said at least one first software tool including a first reliability and trustability verifier module and being configured to record and evaluate the corresponding messages to determine whether there is a security-relevant attack on the industrial automation network;
program code instructions for transmitting the corresponding messages in the industrial automation network to at least one second software tool within a second security station, said at least one second software tool including a second reliability and trustability verifier module and being configured to record and evaluate the corresponding messages and to determine whether the corresponding messages were generated by the preconfigured at least one data processing device;
program code instructions for simulating attack scenarios by the second software tool by generating messages corresponding to a respective scenario by the preconfigured at least one data processing device in the first state, said messages corresponding to the respective scenario generated by said simulation being excluded from said evaluation in the first reliability and trustability verifier module; and program code instructions for issuing a warning signal on a service device to indicate required maintenance measures when the corresponding messages were not generated by the preconfigured at least one data processing device;

wherein connectors to the preconfigured at least one data processing device are each requested by an issued signal or a command to check whether the preconfigured at least one data processing device generated messages which correspond to the one or more security-relevant events belonging to respective standard scopes of each of the plurality of data processing devices, the connectors sending a reply signal to the second reliability and trustability verifier module in response to the issued signal or command to report a respective result of the check.

9. The method as claimed in claim 1, wherein the preconfigured at least one data processing device is at least one of a programmable logic controller, a controller, network components comprising routers, switches or gateways, and field devices comprising actuators or measuring transducers for pressure, temperature or flow rate.

* * * * *